United States Patent [19]

Girault et al.

[11] 4,360,876
[45] Nov. 23, 1982

[54] CARTOGRAPHIC INDICATOR SYSTEM

[75] Inventors: Hervé Girault; Jean C. Reymond; Pierre Cauzan, all of Paris, France

[73] Assignee: Thomson-CSF, Paris, France

[21] Appl. No.: 164,533

[22] Filed: Jul. 2, 1980

[30] Foreign Application Priority Data

Jul. 6, 1979 [FR] France .............................. 79 17601

[51] Int. Cl.³ .............................................. G06F 15/50
[52] U.S. Cl. ................................... 364/449; 364/521; 364/443; 340/24; 343/112 C
[58] Field of Search ............... 364/443, 449, 452, 460, 364/461, 444, 521; 343/112 C, 112 PT, 5 EM, 5 MM; 358/103, 104, 108, 127, 128.5, 128.6; 340/24, 27 NA, 728, 798; 73/178 R

[56] References Cited

U.S. PATENT DOCUMENTS

| | | | |
|---|---|---|---|
| 3,507,993 | 4/1970 | Mulley | 364/460 |
| 4,071,895 | 1/1978 | Wood et al. | 358/103 |
| 4,086,632 | 4/1978 | Lions | 364/521 |
| 4,130,834 | 12/1978 | Mender et al. | 358/127 |
| 4,138,726 | 2/1979 | Girault et al. | 340/24 |
| 4,161,753 | 7/1979 | Bailey et al. | 358/128.5 |
| 4,240,108 | 12/1980 | Levy | 358/103 |
| 4,253,150 | 2/1981 | Scovill | 364/449 |

*Primary Examiner*—Mark E. Nusbaum
*Assistant Examiner*—Gary Chin
*Attorney, Agent, or Firm*—Karl F. Ross

[57] ABSTRACT

An indicator system satisfies multiple flight-mission requirements by providing an aircraft pilot with a visual display consisting of a movable map and navigational data. The map is stored in video form in a high-capacity compact mass memory consisting of a video disk. The system further comprises a symbol and character generator as well as an intermediate memory which has a capacity larger than required for the map-zone image to be displayed together with navigation symbols on a television monitor. The unit is controlled by a microprocessor on the basis of data relating to latitude, longitude and heading of the aircraft in order to refresh the intermediate memory and to obtain an image displayed with a "top-north" or "top-heading" orientation.

4 Claims, 7 Drawing Figures

CARTOGRAPHIC INDICATOR SYSTEM

This invention relates to a cartographic indicator system for the combined visualization of a movable map and of navigational data.

The invention is more particularly applicable to the construction of an electronic air-navigation indicator system. A cartographic indicator is primarily intended to provide an aircraft pilot with a geographical map of the land area over which his aircraft is flying. The map is intended to move continuously in relation to the flight of the aircraft and its position is controlled automatically in the two directions of cartesian axes X and Y as a function respectively of the longitude and latitude of the aircraft. Furthermore, the course of the aircraft can be taken into account in order to control the position of the map in rotation θ. Data relating to latitude, longitude and course are supplied by the navigation system of the aircraft (sensors, inertial navigation unit and so on). The cartographic indicator comprises computing means (airborne computer, specialized computing circuits and so on) which utilize navigational data in order to control servo systems for positioning the map visualized at X, Y and θ.

In addition to visualization of a geographical map or the like, the indicator system produces a reference mark or representative point indicating the position of the aircraft or alternatively of a target to be hit or any other particular point.

It has proved useful in practice to visualize other items of information relating to navigation such as speed, fuel consumption, course to be followed and so forth. Such items of information are fairly frequently produced by CRT (cathode-ray tube) display, the line being plotted in accordance with the so-called random-scanning mode so as to form the symbols (vectors, circles and so on) or the alphanumeric characters to be displayed.

It is a common practice to produce navigational and other information such as tactical data combined with the information provided by the geographical map of the region traversed by the aircraft and displayed on a single CRT (cathode-ray tube). In accordance with a corresponding technique which is already known and described in particular in U.S. Pat. No. 3,507,993, the map information is pre-recorded as a function of the course to be followed and stored in video form on a magnetic tape in the case of the geographical areas to be traversed during a particular mission under consideration. The video tap is placed on board the aircraft in a readout device which is synchronized with the forward travel of the aircraft with respect to the ground in such a manner that both the tactical and navigational information combined with the map information are produced in superimposition on the screen of the cathode-ray tube.

Reference is also made to commonly owned U.S. Pat. No. 4,138,726.

This design solution is subject to disadvantages arising from the fact that the recording remains fairly substantially limited to flight over land areas corresponding to the mission. Since a different route corresponds to each new mission, a fresh recording must therefore be performed. Recording of a geographical map covering a very large area and corresponding to a plurality of routes and missions cannot be contemplated, mainly on account of the excessive access times and the greater complexity of coding.

One aim of the present invention is to overcome these limitations by employing in particular a high-capacity fast-access mass-memory unit of the video disk type which makes it possible to record a map of a very large area and permits high flexibility of operation.

In accordance with a distinctive feature of the present invention, there is provided a cartographic indicator of the type comprising means for storage and reading of the map which is recorded in the form of a video signal adapted to the visual display envisaged and of coded position signals, means for generating symbols and especially an aircraft position signal, and means for combined visual display of the map video and of the symbols. Computation and management means are also provided for controlling as a function of the aircraft position, on the one hand the reading of the stored map and the selection of the video corresponding to the ground area being traversed by the aircraft and, on the other hand, the symbol generator for extraction of the desired symbols. In accordance with the invention, storage and reading means are designed in the form of a video disk device in which the map is recorded zone by zone while subdividing the map into two sets of adjacent bands parallel to a first reference direction Y. Said sets of bands are relatively displaced in the second reference direction X at right angles to the first so that the respective bands overlap in the direction of relative displacement. The coded position signals correspond to the latitude and to the longitude of each zone and the map video signal is transmitted to the display unit via an intermediate memory or storage device having a capacity which is larger than that of the image to be displayed.

These and other features of the invention will be more apparent upon consideration of the following description which is given by way of example and not in any limiting sense, reference being made to the accompanying drawings, in which.

Figure 1:
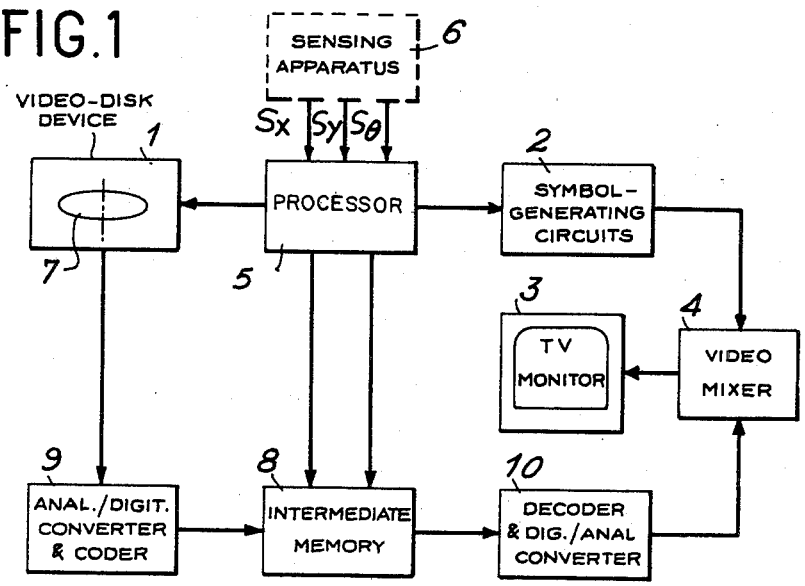
FIG. 1 is a general diagram of a cartographic indicator system in accordance with the invention.

In the general diagram of FIG. 1, the cartographic indicator system comprises in combination: means 1 for storage and reading of the map recorded in the form of a video signal adapted to the display envisaged such as, for example, a television image resulting from a line-by-line scan of the screen of a monitor; symbol-generating means 2 for producing in particular a reference mark representing the aircraft position in the display image; means for combined display of the map video and of the symbols represented by a display device 3 such as a television monitor, and a mixing circuit 4 or the like for combining the map video and the symbol video to be displayed; means for computation and management of the complete assembly in order to control on the one hand the device for map reading at 1 and selecting the map video corresponding to the overflight zone or ground area traversed by the aircraft and, on the other hand, the symbol generator for extraction of the desired symbols as the flight proceeds: these means are designated schematically by a block 5 which can essentially consist of a microprocessor which receives the aircraft-position data SX, SY and S$\theta$ from ancillary instruments 6 installed on board and forming part of the navigation system. The signals SX and SY correspond to the latitude and to the longitude and the signal S$\theta$ corresponds to the course of the aircraft.

In accordance with the invention, the memory device shown at 1 and employed for storing the map is designed in the form of a video disk 7 which is read according to requirements. The block 1 represents a video disk device with its means for reading and driving of the video disk.

In accordance with another particular feature of the invention, the map signal extracted by controlled readout of the disk is not transmitted directly to the display device 3. An intermediate memory device 8 is interposed in this link. Said intermediate memory has a higher capacity than that of the image to be displayed on the screen at 3 as well as providing random access to writing and providing sequential readout at the same frequency as the display. The management unit 5 produces corresponding command signals for reading and writing control of the memory 8 as a function of the data X, Y and $\theta$. As will become apparent hereinafter, introduction of the memory 8 in the combination makes it possible to limit the video-disk readout since only the memory-refreshment video signals are to be extracted as a function of the flight evolution of the aircraft. This memory introduction also makes it possible to solve the problem of continuity of display and to take into account the course parameter $\theta$.

The combination is completed by a circuit 9 for analog-to-digital conversion and coding of the information extracted from the video disk for subsequent writing of said information in the intermediate memory 8. Similarly, a circuit 10 for decoding and digital-to-analog conversion is provided for processing the data extracted from the intermediate memory 8 in order to display the map on the indicator 3. The connections between the blocks 5 and 8 represent in schematic form the read/write controls of the intermediate memory 8.

The cartographic indicator system makes use of the mass-memory unit 1 of the video-disk type which is read according to requirements by means of a suitable control signal generated by the management and computation circuits 5 as a function of the aircraft position parameters. The advantage thus secured is undeniable since the number of images stored on a video disk 7 is very large and can amount to 50,000 images, thus endowing the memory unit 1 with a very high density. By way of example, in order to display on the screen of the indicator 3 images 13×18 cm in size of a map having a scale of 1/25000, the video disk is capable of storing a total map covering a ground area of approximately 8500×8500 km. In one non-limitative embodiment, the disk 7 which is usually of plastic material permits recording of the map which is accordingly written thereon in the form of grooves forming a spiral. The disk is driven in rotation at a speed of 25 revolutions per second, for example; one revolution corresponds to the recording of one video image. Writing of the video signal is performed in a succession of micro-cups of variable length and spacing along each turn, thus constituting a groove. The pitch of the spiral is approximately 1.6 $\mu$m and the width of each micro-cup is approximately 0.6 $\mu$m. A disk 30 cm in diameter can consist of 50,000 recording turns.

Figure 2:
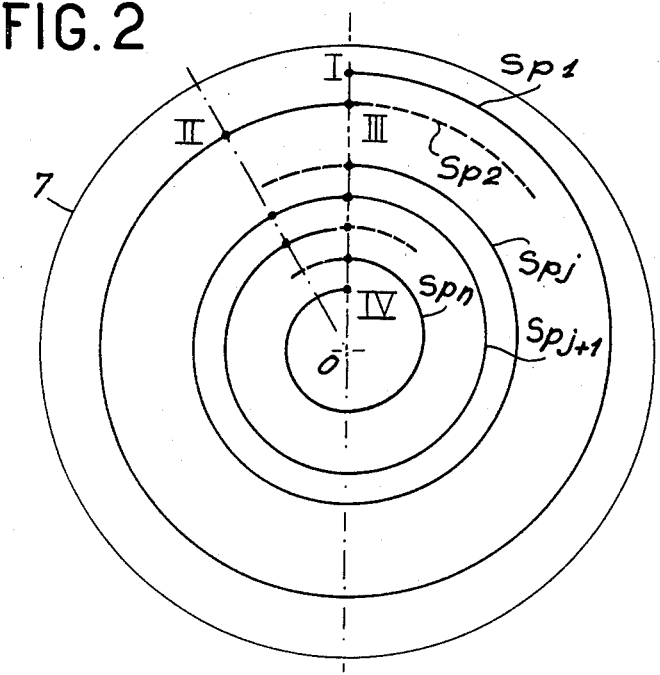
FIG. 2 is a diagram relating to the recording performed in a mass memory device of the video disk type.

In accordance with FIG. 2, the turns $SP_1$ to $SP_n$ constituting the disk groove are spaced at intervals between the first turn $SP_1$ having the longest radius OA and the last turn $SP_n$ having the shortest radius OD. One sector of each turn is reserved for the purpose of recording signals other than the video image such as, for example, the image number information and the frame synchronization. This sector is represented by the portion BC of the turn $SP_1$, the video image and the line synchronization being recorded on the portion AB in accordance with known techniques, with or without image interlacing.

The cartographic indicator system in accordance with the invention is intended to form the geographical map image corresponding at each instant to a well-defined region traversed by the aircraft with a representative point corresponding to the aircraft position and indicated with a high degree of precision. The map is oriented in a predetermined direction, for example in the direction of the geographical meridians corresponding to the vertical axis of symmetry of the display screen (North representation at the top of the image, vertical North-South axis) or the direction of the course of the aircraft in the same direction (Course representation at the top, vertical route). In consequence, the map image must be capable of undergoing three independent movements: vertically in the direction of the Y-axis and horizontally in the direction of the X-axis (cartesian movements) and angularly at $\theta$ (polar movement for the top Course representation).

In order to obtain these results, the map is recorded zone by zone. The zones are successive in one of the reference cartesian directions such as the Y-axis and overlap partially from one zone to the next in the second reference direction X.

Figure 3:
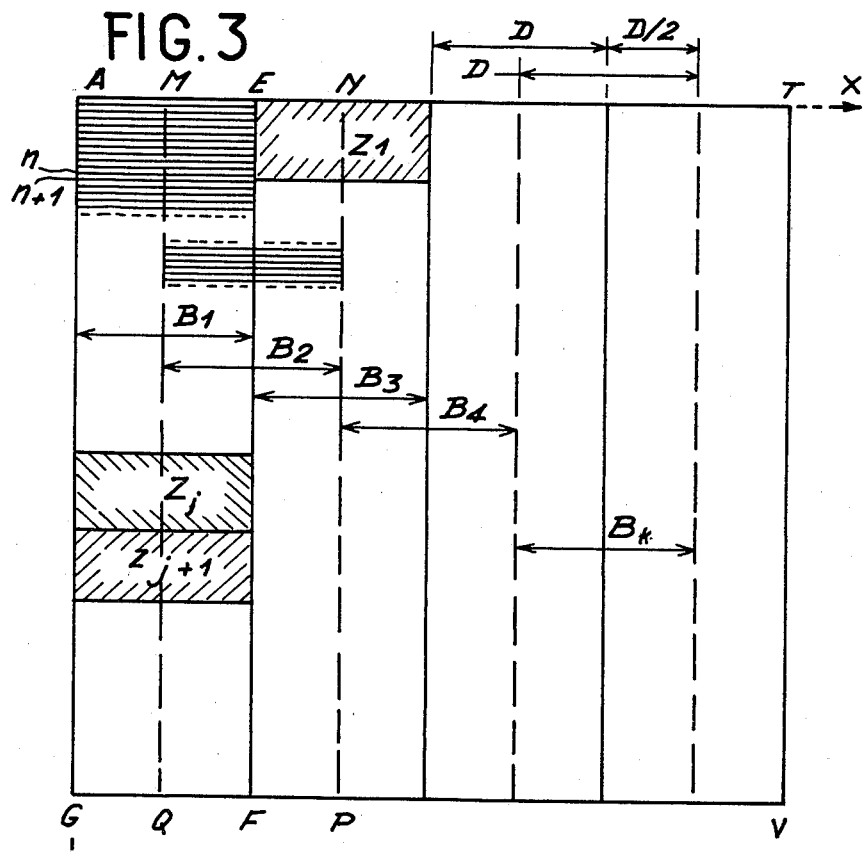
FIGS. 3 and 4 are diagrams relating to subdivision of the map into zones for recording and to a possible corresponding localization on the video disk.
Figure 4:
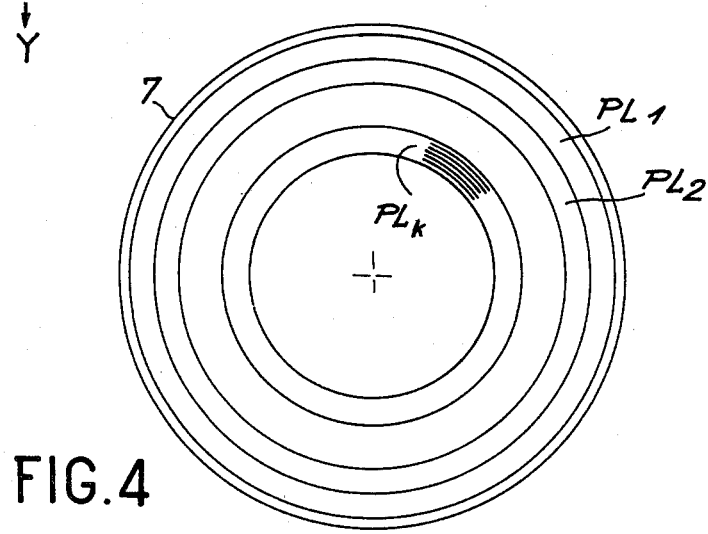

FIGS. 3 and 4 illustrate the method adopted for subdividing the map into zones at the time of recording. This operation is performed in accordance with known techniques by means of a television camera, the map being placed on a table which is displaced along the X and Y axes. The direction Y corresponds to the direction of the geographical meridians. The map OTVG is considered as subdivided into two sets of adjacent bands parallel to one of the reference directions, the sets of bands being relatively displaced in the second reference direction so that the bands overlap to a partial extent from one band to the next. A first band B1 corresponds to the area OEFG, the second band B2 corresponds to the area MNPQ containing the area MEFQ which is common with the first band, and so on. The odd-numbered bands B1, B3 . . . form the first set and the even-numbered bands B2, B4 . . . form the second set. The double subdivision or map breakdown produced by these bands has been differentiated by indicating the odd-numbered bands B1, B3 . . . in full lines and the even-numbered bands B2, B4 . . . in dashed lines. Recording is carried out in a line-by-line scan, the lines being in the direction X at right angles to the direction of the bands. The successive zones (each zone corresponds to one television image of the recording) can be picked-up by passing from one band to the next in the direction of the X-axis or else by first recording the contents of the band B1 followed by the contents of the band B2 and so on in the direction of the Y-axis. The version just mentioned is shown in FIGS. 3 and 4 which show two successive zones Zj and Zj+1 of the band B1, each zone being constituted by n scanning lines. One image recorded on one turn of the video disk corresponds to each zone. Recording of the band B1 is represented by a segment PL1 on the disk; the segment PL2 corresponds to the following band B2 and so on in sequence. If the width of the bands in the direction X is designated by the letter D, the overlap is preferably chosen so as to be equal to D/2 for reasons of symmetry. The overlap makes it possible in cooperation with the intermediate memory to ensure continuous display on the indicator at the time of zone traversal as will become apparent hereinafter.

Figure 5:
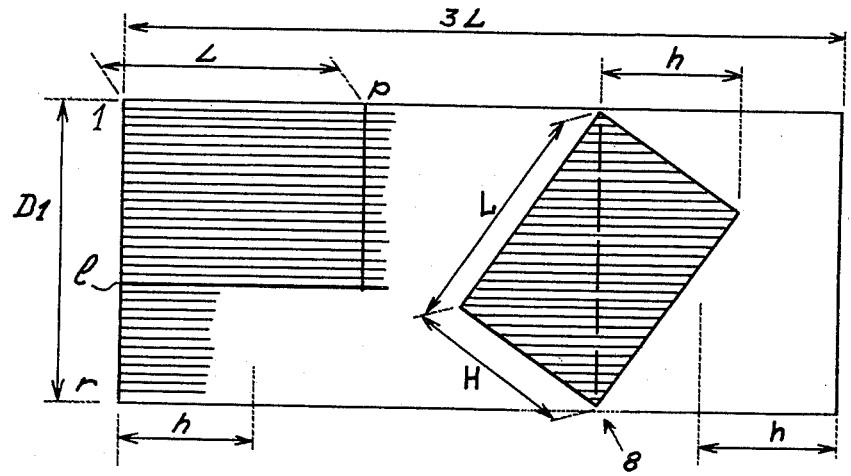
FIG. 5 is a diagram relating to the intermediate memory device employed in the system.

The intermediate memory 8 has a predetermined capacity for storage of a plurality of base images, the base image being intended for visual display. The number of memory cells is equal to N. l.p.b.c., where N is the number of base images, l is the number of lines of the base image and p is the number of points per line, b is the number of luminance bits and c designates the number of chrominance bits in the case of a color display. The memory 8 can be of the semiconductor type with either random or sequential access to writing and to reading of data stored in lines and points by lines. The number of layers of N.l.p points is a function of the number of bits b and c. For example, four layers make it possible to record four luminance levels and twelve chrominance values. The capacity of the memory 8 takes into account the image rotation to be introduced by the course parameter $\theta$ (navigation on a course "at the top") as shown in FIG. 5; the number r of lines stored per layer corresponds at least to the number which is necessary in order to contain the information of the diagonal line D1 of the image, the dimensional value of which is given by $\sqrt{L^2+H^2}$, where L is the width of the image displayed and H is its height. In the example shown in the figure, it is considered that the number r of lines corresponds to one or a number of "zone Zj" images recorded on the disk and that the dimension D of the bands corresponding to the width of the lines is chosen so as to be equal to three times the width L of the displayed image; in the case of a ratio L/H equal to 4/3 for example, r=5/3 l and the number N of base images stored in the memory will be equal to five.

The number r of stored lines is greater than the number l of the displayed image, thus providing a range of displacement for the movement of the displayed map along the Y-axis. Depending on the direction of motion, the memory is refreshed with data derived from the adjacent zone $Z_{j-1}$ or $Z_{j+1}$. Thus, in the case of a movement on the Y-axis in the direction OY, the zone Zj+1 will be progressively introduced in memory instead of the top lines on the zone Zj which have become useless. This result is obtained by reading the corresponding turns of the video disk and selecting the l useful lines in the successive recorded images.

Similarly, it is apparent that the capacity of the intermediate memory permits a range of variation in the case of the movement along the X-axis which can be determined by $3L-2h$, where h is equal to $HL/D1^2$ in order to ensure that the image to be displayed remains within the stored zone irrespective of the course $\theta$. When one of these lateral limits has been reached, it becomes necessary to refresh the memory with the data corresponding to the following overlap zone. Thus, in the case of a movement in the direction OX, the data of the zone Zj of the band Bk+1 are extracted and replaced by those of the zone Zj of the band Bk. Taking the band overlap into account, the refresh operation corresponds to the first half of the lines and does not produce any discontinuity of display.

The stored lines each comprise 3p points by analog-to-digital conversion and coding at 9 of the signals derived from the video disk. As a function of the parameters X, Y and $\theta$ which represent the flight evolution of the aircraft, the computation and management unit 5 determines the fractions of lines to be extracted from the memory 8 in order to constitute the moving-map image to be displayed for the readout operation, as well as the lines or fractions of lines of successive zones to be introduced at the time of writing in order to refresh the memory continuously.

Figure 6:
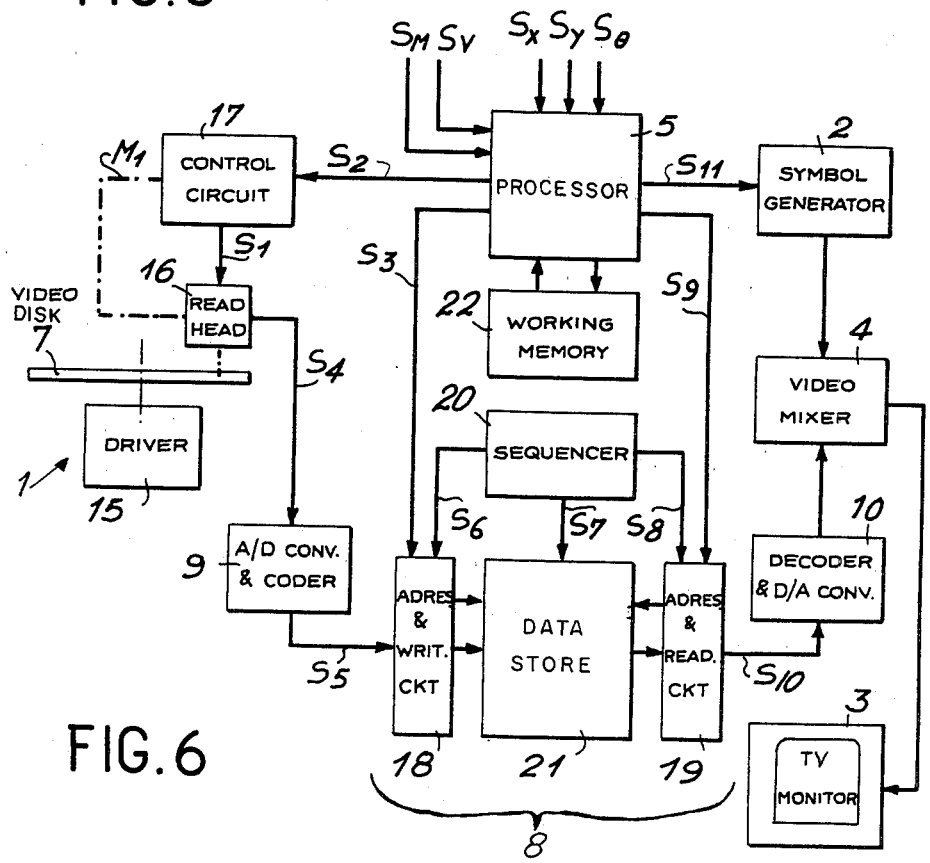
FIG. 6 is a diagram in accordance with FIG. 1, in which the memory devices are shown in detail.

In the diagram of FIG. 6, the memories are shown in greater detail. In the video-disk or mass-memory device are grouped together the video disk 7 with its circuit 15 for driving the disk in rotation at constant speed, the read head 16 and an associated control circuit 17 for controlling the positioning of the read head and the collection by optical reading of information recorded on the disk. The circuit 17 produces mechanical control of the radial positioning of the head 16 by means of a mechanical coupling M1 and electronic control of the instant of collection via the output S1. The instant of collection may be located at the beginning of a turn, namely on the first line of a recorded image or during a turn, namely on a predetermined line of a recorded image. The version last mentioned corresponds to the operation which consists in carrying out a fine relative displacement along the Y-axis at the level of the video disk, the relative displacement zone by zone being produced by the mechanical drive M1. Line selection may be performed just as readily at the write input level of the intermediate memory in the case of disk reading at the beginning of each turn. Depending on the design solution adopted, corresponding control signals S2 and S3 are generated by the computation and management circuit 5; this circuit can be designed in the form of a microprocessor which receives the information SX, SY, S$\theta$ in digital form from an ancillary airborne computer (not shown). The processor 5 thus permits practically random access to the mass memory and the circuit 17 permits access to a particular image or to a particular image line.

The intermediate memory is represented schematically by an addressing and writing circuit 18, an addressing and reading circuit 19, a sequencing circuit 20 and the memory 21 proper. The output S4 of the video disk is converted to digital representation point by point in the case of each line by the circuit 9 which carries out coding of the luminance and of the chrominance. The data S5 thus produced are transmitted to the circuit 18 which associates with each coded point a memory address, the evolution algorithm of which is predetermined by the management processor 5 in the form of the signals S3. The sequencer 20 distributes the priorities of access to the memory in the form of periodic control signals S6, S7, S8. The read circuit 19 serves to collect images to be displayed at the rate of any television standard, the starting address in the memory being initialized by the management processor 5 and represented schematically by the connection S9. The output S10 of the intermediate memory is transmitted to the circuit 10 for reconstituting the video signal with the frame and line synchronization signals and the chrominance in order to supply the television monitor 3.

Simultaneous display of symbols can be carried out, for example, by incrustation by means of the mixer 4. The symbol generator 2 is controlled by the output S11 of the processor 5 so as to deliver the signals of the various parameters to be displayed during flight. Data relating to identification of the different symbols and characters to be produced during the mission as well as their respective positions in the image are stored beforehand in a working memory 22. The aircraft reference mark can be produced, for example, at the center and at the bottom of the displayed image so that this latter may correspond mainly to the geographical region which is directed towards the front of the aircraft.

Construction of the computation and management unit 5 and of the intermediate memory 8 is considered as carried out in accordance with known techniques. In particular, programming depends on the mode of subdivision and recording of zones and on the organization of the intermediate memory. The computing means such as a microprocessor receives the navigational data such as aircraft position (SX, SY), course (S8) as well as other data, in particular the speed SV of the aircraft and the choice made by the pilot in regard to the mode SM of North representation or Course "at the top". On the basis of these data, the pilot plots the coordinates X, Y of the center of the image to be displayed, the polar angle of the representation, and identifies the zones or portions of zones to be extracted from the video disk.

Figure 7:
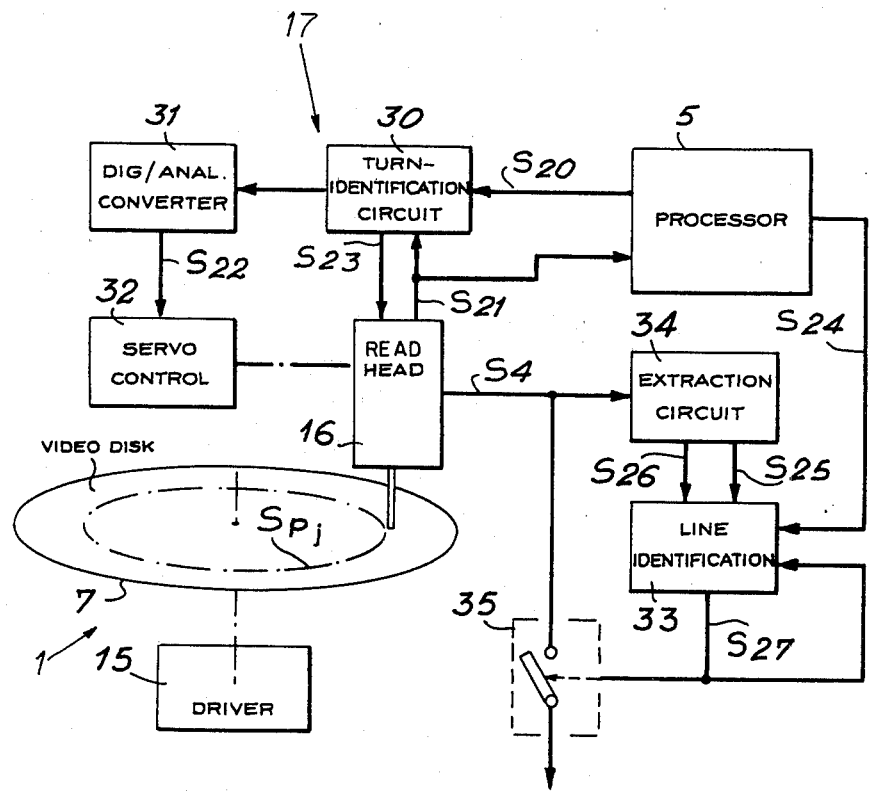
FIG. 7 is a partial diagram relating to one embodiment of the control circuits of the video disk device.

By way of indication, FIG. 7 is a general arrangement diagram of the video disk control system. The information S20 relating to the image to be selected or in other words to the turn SPj on which said image is recorded is delivered by the processor 5 to an identification logic circuit 30 such as a bidirectional counter in which the datum S20 is compared with the corresponding information S21 delivered by the read head. The datum S21 includes the image number written on a reserved portion BC of the turn (FIG. 2) and represents the radial position of the read head. The digital output of the comparator 30 is converted to an analog signal S22 which supplies a servo circuit 32 for radial positioning of the head 16. When the head is positioned on the desired turn SPj, the error signal S22 is reduced to zero and the circuit 30 delivers a read permission signal S23 which initiates production of the output signal S4 of the read head. The other circuits shown in the figure relate to line selection in the recorded image, this selection being considered as effected at the level of the video disk. The radial locking information is transmitted to the processor 5 by the signal S21 or in an equivalent manner by the output of the circuit 30. As soon as radial positioning has been completed, the circuit 5 delivers the information relating to the line number to be selected to a bidirectional counter circuit 33. The output S4 of the video disk is transmitted to a circuit 34 for extraction of the frame and synchronization signals S25 and S26 respectively. The frame signal initiates counting of the synchronization signals until coincidence with the line number to be selected. At this instant, the output 27 initiates closure of the switching circuit 35, thus permitting transmission of the signal S4 on the downstream side towards the intermediate memory 8. The signal S27 also trips and resets the circuit 33 to zero. Similarly, the end of collection of the recording can be initiated by transmitting fresh line information in an image considered to the circuit 33 and producing after counting a reverse action of opening of the switching circuit 35.

The cartographic indicator system hereinabove described permits of many variants in accordance with the characteristics explained in the foregoing. One of these variants consist in particular in recording zones Zj corresponding to the image to be displayed, the bands being of width L. In this context, the capacity of the intermediate memory can be reduced and correspond to three base images by collection of two zones along Y out of two successive bands. Management of the system is determined in consequence and results in more frequent refreshments of the intermediate memory and therefore in more numerous accesses to the video disk. The solution to be adopted therefore results from a compromise in order to achieve operational reliability with a limited capacity of the intermediate memory.

What is claimed is:

1. A cartographic indicator system aboard an aircraft, comprising:

data-storing means including a video disk, carrying prerecorded information reproducible on a screen of a cathode-ray tube as an image of a map of territory overflown by the aircraft, and reading means for extracting the information carried on selected portions of said disk, the information in said portions relating to image points of respective rectangular zones of a map to be visualized, said zones all having the same width and height, said map being subdivided into a plurality of bands extending in a first reference direction Y and adjoining one another in a second reference direction X orthogonal to said direction Y, each of said bands having a width equal to that of said zones in said direction X and containing a multiplicity of said zones adjoining one another in said direction Y, one of said reference directions corresponding to geographic longitude, the other of said reference directions corresponding to geographic latitude;

sensing means for supplying coordinate signals $S_X$, $S_Y$ representing geographical position and a rotational signal $S_\theta$ representing heading of the aircraft at any instant;

an intermediate memory with cells arranged in a multiplicity of rows of a matrix, said multiplicity exceeding the number of cells necessary for storing the data relating to all the image points of a zone, the number of rows and the number of cells per row being at least equal to the number of image points lying in the diagonal of a zone to facilitate a visual representation of the map image in any angular orientation upon sequential readout of said cells;

monitoring means including a cathode-ray tube connected to said intermediate memory; and processing means responsive to said sensing means for controlling the loading of said cells with data extracted from selected portions of said disk in a manner enabling a display of a map image on the screen of said cathode-ray tube, upon sequential readout of said cells, with variable angular orientation determined by said rotational signal $S_\theta$.

2. A system as defined in claim 1, further comprising a symbol generator controlled by said processing means and a mixer in the connection between said intermediate memory and said monitoring means, said mixer having an input connected to said symbol generator for superimposing an indication of the position of the aircraft upon the displayed map image.

3. A system as defined in claim 1 or 2 wherein said processing means is switchable by a pilot-generated selection signal $S_m$ between a top-north and a top-heading operating mode, the displayed map image being invariably oriented on said screen in a predetermined geographical position in said top-north mode and being variably oriented under the control of said rotational signal $S_\theta$ in said top-heading mode.

4. A system as defined in claim 1 or 2 wherein the bands correlated with said portions of said disk overlap in said direction X whereby every even-numbered band encompasses parts of the zones of adjacent odd-numbered bands.

* * * * *